United States Patent Office 3,706,818
Patented Dec. 19, 1972

3,706,818
PROCESSES USING POLYPEROXIDES AFFORDING SEQUENTIAL FREE RADICAL GENERATION
Orville Leonard Mageli, Kenmore, and Antonio Joseph D'Angelo, Buffalo, N.Y., assignors to Pennwalt Corporation
No Drawing. Filed July 17, 1968, Ser. No. 745,416
Int. Cl. C08f 19/10
U.S. Cl. 260—885   7 Claims

ABSTRACT OF THE DISCLOSURE

Organic syntheses requiring free radical initiation in two stages are carried out using as the source of sequential free radicals a polyperoxy compound having at least two functional peroxy groups, at least one of these having a half-life different from the other functional peroxy groups.

Example: Styrene monomer and di-t-butyl alpha-(methoxycarbonyl)diperoxysuccinate were reacted at about 60° C. to obtain a polystyrene containing functional peroxy groups. The polystyrene-peroxy polymer was reacted with methyl methacrylate monomer at 85° C. to obtain a block copolymer of polystyrene and poly(methyl methacrylate).

BACKGROUND OF THE INVENTION

(1) Field of the invention

This invention relates to the preparation of organic compounds wherein sequential free radical intiation is utilized. More particularly the invention relates to such reaction wherein a polyperoxide containing functional peroxy groups of different half-lifes is used as the source of the sequential free radicals. Also the invention relates to the preparation of vinyl polymers containing functional peroxy groups and to block copolymerization using such vinyl-peroxy polymers.

(2) The prior art

Heretofore syntheses which required sequential free radical initiation utilized two or more different compounds capable of providing free radicals; the compounds being selected to provide free radicals at different conditions as called for by the reaction. Commonly compounds which fall into different chemical classes are used.

SUMMARY OF THE INVENTION

The polyperoxy compounds of the invention are called sequential free radical initiators because one of the peroxide functions present in the same molecule can be preferentially decomposed to generate free radicals for a particular application (e.g. vinyl monomer polymerization) while keeping the remaining function(s) substantially undecomposed for a later application (e.g. formation of a block copolymer with another vinyl monomer polymerization).

These sequential and/or preferential decompositions can be accomplished by a variety of techniques. One method is to use two different temperatures, taking advantage of the difference in the thermal rates of decomposition of the different peroxide functions present in the molecule. Another method, also based on the different thermal rates of decomposition, is to use the same temperature but different reaction times. Still another method is to use activators e.g. amines, transition metal salts etc., which preferentially decompose some of the peroxide functions present while the others remain intact. The remaining peroxide functions then can be decomposed either thermally or by irradiation (e.g. ultraviolet).

Still another technique is to decompose one portion thermally and the remaining by irradiation or vice-versa. Another method is to use two different radiation sources in sequence where one source preferentially decomposes one portion of the peroxide function present and the other source attacks the remaining peroxide functions. Thus, by taking advantage of the difference in the physical and chemical properties of these novel peroxy-compounds of structures A and B, a variety of techniques can be used for sequential free radical generation. Sequential free radical generation is very useful in the vinyl polymerization field. Block copolymers can be made from any combination of polymerizable vinyl monomers. Sequential free radical generation is also employed in the conventional polymerization of ethylene and styrene. The present art accomplishes this by using two or more polymerization initiators of different thermal stability.

The novel polyperoxy sequential radical initiators are represented by the following general structure:

(A)   $(P_1)_n$—R—D—$R^1(P_2)_m$
where:

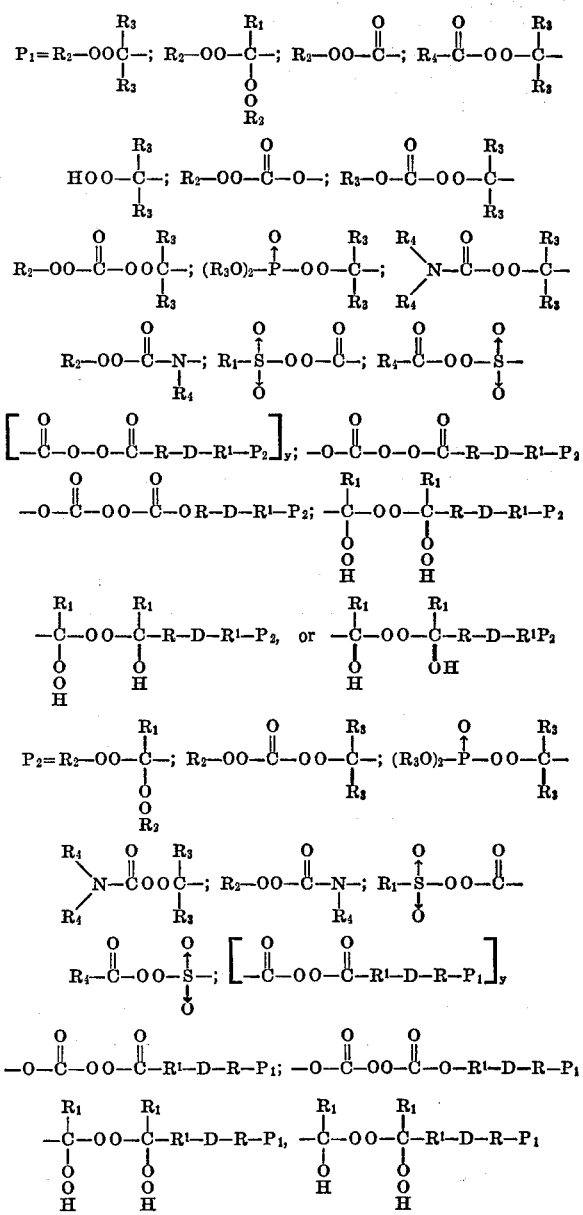

or $$-\underset{\underset{H}{\overset{\overset{R_1}{|}}{C}}}{-}OO-\underset{\underset{H}{\overset{\overset{R_1}{|}}{C}}}{-}R^1-D-R-P_1$$

D = nothing;

$$-X-\overset{\overset{X}{\|}}{C}-;\quad -X-\overset{\overset{X}{\|}}{C}-X-;\quad -\overset{\overset{O}{\|}}{C}-O-\overset{\overset{O}{\|}}{C}-;\quad -\overset{\overset{O}{\|}}{\underset{\underset{O}{\|}}{S}}-O-;\quad -\overset{\overset{O}{\|}}{\underset{\underset{O}{\|}}{S}}-\underset{\underset{R_4}{|}}{N}-$$

$$-\overset{\overset{O}{\|}}{C}-\underset{\underset{R_4}{|}}{N}-;\quad -O-\overset{\overset{O}{\|}}{C}-\underset{\underset{R_4}{|}}{N}-;\quad -X-,\quad \text{or}\quad -\overset{\overset{\uparrow}{S}}{\underset{\underset{\downarrow}{O}}{}}-$$

X = oxygen or sulfur;
R and $R^1$ = aliphatic, cycloaliphatic, aromatic, polyvalent radicals of 1 to 15 carbons and R and $R^1$ can be the same or different and R or $R^1$ can also be nothing;
$R_1$ = aliphatic of 1 to 10 carbons and cycloaliphatic of 3 to 12 carbons;
$R_2$ = t-aliphatic and t-cycloaliphatic having 4 to 13 carbon atoms;
$R_3$ = aliphatic of 1 to 10 carbons, cycloaliphatic of 3 to 12 carbon atoms or aromatic radical of 6 to 12 carbons;
$R_4$ = hydrogen, aliphatic of 1 to 10 carbons, cycloaliphatic of 3 to 12 carbons, or aromatic of 6 to 12 carbons;
$m$ and $n$ = 1 or 2; and
$y$ = at least 1, commonly 1–4.

In another aspect of the invention, since structure (A) was defined to cover the new compositions of matter, structure (B) is now defined to include all the polyfunctional peroxy compounds operable in the preparation of block and graft copolymers.

(B)  $(P''_1)_n-R-D-R^1-(P'_1)_m$ where $P'_1$ and $P''_1$ can be a combination of the following groups but not the same $$R_2-OO-\underset{\underset{R_3}{|}}{\overset{\overset{R_3}{|}}{C}}-;\quad R_2-OO-\underset{\underset{O}{|}}{\overset{\overset{R_3}{|}}{C}}-;\quad R_2-OO-\overset{\overset{O}{\|}}{C}-;\quad R_4-\overset{\overset{O}{\|}}{C}-OO-\underset{\underset{R_3}{|}}{\overset{\overset{R_3}{|}}{C}}-$$

$$HOO\underset{\underset{R_3}{|}}{\overset{\overset{R_3}{|}}{C}}-;\quad R_2-OO-\overset{\overset{O}{\|}}{C}-O-;\quad R_3-O\overset{\overset{O}{\|}}{C}-OO-\underset{\underset{R_3}{|}}{\overset{\overset{R_3}{|}}{C}}-$$

$$R_2-OO-\overset{\overset{O}{\|}}{C}-OO-\underset{\underset{R_3}{|}}{\overset{\overset{R_3}{|}}{C}}-;\quad (R_3O)_2-\overset{\overset{\uparrow}{P}}{-}OO-\underset{\underset{R_3}{|}}{\overset{\overset{R_3}{|}}{C}}-$$

$$\left[-\overset{\overset{O}{\|}}{C}-OO-\overset{\overset{O}{\|}}{C}-R-D-R^1-P'_1(P''_1)\right]_y$$

$$-O-\overset{\overset{O}{\|}}{C}-OO-\overset{\overset{O}{\|}}{C}-R-D-R^1-P'_1(P''_1)$$

$$-O-\overset{\overset{O}{\|}}{C}-OO-\overset{\overset{O}{\|}}{C}-O-R-D-R^1-P'_1(P''_1)$$

$$-\underset{\underset{H}{\overset{\overset{R_1}{|}}{C}}}{-}OO-\underset{\underset{H}{\overset{\overset{R_1}{|}}{C}}}{-}R-D-R^1-P'_1(P''_1);\quad (R_4)_2-N-\overset{\overset{O}{\|}}{C}-OO-\underset{\underset{R_3}{|}}{\overset{\overset{R_3}{|}}{C}}-$$

$$R_2-OO-\overset{\overset{O}{\|}}{C}-\underset{\underset{R_4}{|}}{N}-;\quad R_1-\overset{\overset{O}{\|}}{\underset{\underset{O}{\|}}{S}}-OO-\overset{\overset{O}{\|}}{C}-;\quad R_4-\overset{\overset{O}{\|}}{C}-OO-\overset{\overset{\uparrow}{S}}{\underset{\underset{\downarrow}{O}}{}}-$$

$$-\underset{\underset{H}{\overset{\overset{R_1}{|}}{C}}}{-}OO-\underset{\underset{H}{\overset{\overset{R_1}{|}}{C}}}{-}R-D-R^1-P'_1(P''_1)$$

or $$-\underset{\underset{H}{\overset{\overset{R_1}{|}}{C}}}{-}OO-\underset{\underset{H}{\overset{\overset{R_1}{|}}{C}}}{-}R-D-R^1-P'_1(P''_1)$$

D as defined in A.
R and $R^1$ as defined in A.
$R_1$ as defined in A.
$R_2$ as defined in A.
$R_3$ as defined in A.
$R_4$ as defined in A.

$P'_1$ and $P''_1$ can also have the same peroxide function (e.g. they can both be peroxyesters) but the half-life value of the peroxide functions has to be different. Half-life value can be changed in a peroxide function by branching and/or substitution. t-Butyl peroxyacetate $$\left[(CH_3)_3-COO\overset{\overset{O}{\|}}{C}-CH_3\right]$$

and t-butyl peroxypivalate $$\left[(CH_3)_3-COO\overset{\overset{O}{\|}}{C}-C-(CH_3)_3\right]$$

are both peroxyesters. Due to α-branching we find that t-butyl peroxyacetate has a half-life value of 88 hours at 85° C. and t-butyl peroxypivalate has a half-life value of 0.25 hour at 85° C. Thus a compound of this following structure: e.g.

$$CH_3-\underset{\underset{\underset{\underset{CH_3}{|}}{\overset{\overset{C=O}{|}}{O}}}{|}}{\overset{\overset{CH_3}{|}}{C}}-CH_2-CH_2-\underset{\underset{\underset{\underset{CH_3-\underset{\underset{CH_3}{|}}{\overset{\overset{CH_3}{|}}{C}}-CH_3}{|}}{\overset{\overset{C=O}{|}}{O}}}{|}}{\overset{\overset{CH_3}{|}}{C}}-CH_3$$

would be a sequential free radical initiator because the half life value of the peroxide function attached to the pivaloyl group $$(CH_3)_3-C-\overset{\overset{O}{\|}}{C}-$$

would be half decomposed in 15 minutes while the other peroxide function would be practically intact after this time. On the other hand $P'_1$ and $P''_1$ as defined in B would be identical except that $R_4$ has changed from a non-branched aliphatic radical to a branched aliphatic radical. Thus $P'_1$ and $P''_1$ can be the same peroxy function if branching brings a change in the half-life value of either $P'_1$ and $P''_1$. Half-life value in a peroxide function can also be changed by substitution. If the substituent group is electron withdrawing group then an increase in half-life value $$\left(e.g. NO_2, Cl, CN, \overset{\overset{O}{\|}}{C}-OH \text{ etc.}\right)$$

is observed if the substituent is an electron donor group then the half-life value will decrease.

$$\left(e.g. -\overset{\overset{O}{\|}}{C}O^{\ominus}\right)$$

The following table shows some examples of the half-life change of t-butyl peroxypropionate with electron withdrawing and electron donating substituents.

TABLE I

| Peroxide | Molar conc. | Solvent | Temp. (°C.) | $t_{1/2}$ (hours) |
|---|---|---|---|---|
| $(CH_3)_3-C-OO-\overset{O}{\underset{\|}{C}}-CH_2-CH_3$ | 0.2 | Mineral spirits | 100 | 10.55 |
| $(CH_3)_3-C-OO-\overset{O}{\underset{\|}{C}}-CH_2-CH_2-Cl$ | 0.2 | do | 100 | 21.2 |
| $(CH_3)_3-C-OO-\overset{O}{\underset{\|}{C}}-CH_2-CH_2-\overset{O}{\underset{\|}{C}}-O^{\ominus}Na^{\oplus}$ | 0.2 | Water | 85 | 8.8 |

Thus, a compound of the following structure would also be a sequential free radical generator:

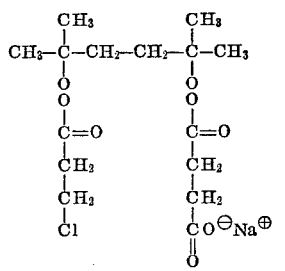

Further preferred definitions of R's:

(1) R and R¹ are polyvalent radicals of saturated, ethylenically unsaturated or acetylenically unsaturated aliphatic or cycloaliphatic hydrocarbons, or benzene or naphthalene hydrocarbons.

(2) R₁ is alkyl, alkenyl, aralkyl or cycloalkyl.

(3) R₂ is t-alkyl, t-alkenyl, t-aralkyl, or t-cycloalkyl.

(4) R₃ is alkyl, alkenyl, aralkyl, cycloalkyl, phenyl, or naphthyl.

(5) R₄ is H, alkyl, alkenyl, aralkyl, cycloalkyl, phenyl, or naphthyl.

It is to be understood that the above preferred definitions include the carbon atom limitations previously set out with respect to the various R's.

Other compounds that can be prepared by conventional methods are:

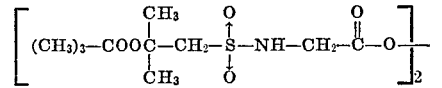 (1)

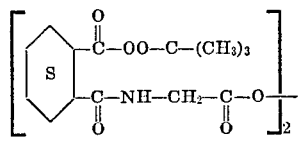 (2)

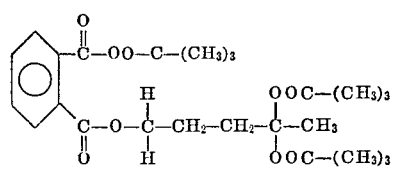 (3)

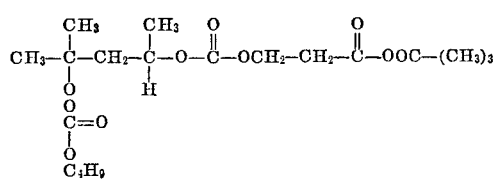 (4)

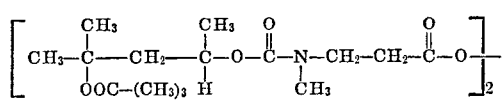 (5)

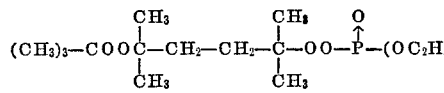 (6)

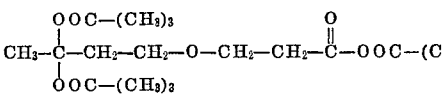 (7)

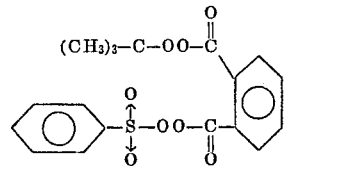 (8)

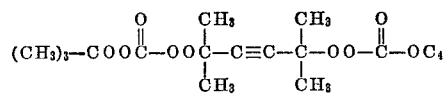 (9)

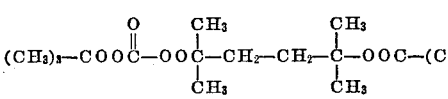 (10)

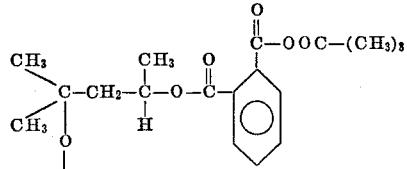 (11)

(12)

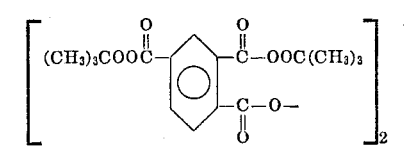 (13)

(14)

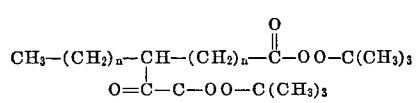 (15)

wherein: $n=7$ or 8, $m=8$ or 7, and $n+m=15$.

(16) Di-t-butyl alpha - (methoxycarbonyl)diperoxysuccinate.

(17) Di-t-butyl alpha-(2 - tetrahydrofuryl)diperoxysuccinate.

(18) Di-t-butyl alpha-(butyryl)diperoxysuccinate.
(19) Di-t-butyl alpha-(pivaloyl)diperoxysuccinate.
(20) Di-t-butyl alpha-(2-isopropxyisopropyl)diperoxysuccinate, otherwise named t-butyl 3-(t-butylperoxycarbonyl)-4-methyl-4-isopropoxyperoxyvalerate.
(21) Di-t-butyl alpha-(acetyl)diperoxysuccinate.

Compounds 16–21 come within structure (B).

DESCRIPTION

(I) Method of preparation

The preparation of the sequential free radical initiators is illustrated by the following examples:

EXAMPLE I

Preparation of di-[1,3-dimethyl-3-(t-butylperoxy)butyl] peroxydicarbonate $$\left[ \begin{array}{c} CH_3 \quad CH_3 \quad O \\ | \quad\quad | \quad\quad \| \\ CH_3-C-CH_2-C-O-C-O- \\ | \quad\quad | \\ O \quad\quad H \\ | \\ C-(CH_3)_3 \end{array} \right]_2$$

Structure A where $P_1 = (CH_3)_3COO-\underset{\underset{CH_3}{|}}{\overset{\overset{CH_3}{|}}{C}}-$ $R = -CH_2-\underset{\underset{CH_3}{|}}{CH}-;\ D = \text{nothing}$ $R^1 = \text{nothing};\ P_2 = -O-\overset{O}{\overset{\|}{C}}-OO-\overset{O}{\overset{\|}{C}}-O-\underset{H}{\overset{CH_3}{\underset{|}{C}}}-CH_2-\underset{\underset{CH_3}{|}}{\overset{\overset{CH_3}{|}}{C}}OOC(CH_3)_3$ $y = 1;\ n = 1;\ \text{and}\ m = 1$ To a solution of 10.8 g. (0.02 mole) of H₂O (6%) cooled at 5±1° C. was added 8.8 g. (0.04 mole) of NaOH (20%). After the addition was completed three drops of a 27% solution of Tergitol was added. To this mixture was added 7.85 g. (0.03 mole) of 1,3-dimethyl-3-(t-butylperoxy)butyl chloroformate. The mixture was allowed to stir for three hours at 26±1° C. and for one hour at 40±1° C. After this time the reaction mixture was extracted with diethyl ether. The ether extract was washed with water to neutrality, dried over anhydrous magnesium sulfate, filtered and the solvent evaporated under reduced pressure. A colorless liquid weighing 5.2 g. was obtained. The IR of this material showed the characteristic bands for the desired product. The peroxydicarbonate $$\left[ \begin{array}{c} CH_3 \quad O \quad\quad O \quad CH_3 \\ | \quad\quad \| \quad\quad \| \quad\quad | \\ -C-O-C-OO-C-O-C- \\ | \quad\quad\quad\quad\quad\quad\quad | \\ H \quad\quad\quad\quad\quad\quad\quad H \end{array} \right]$$

portion of the molecule has a 10 hour half-life at 45° C. and the dialkyl peroxide portion has a 10 hour half-life at approximately 128° C.

EXAMPLE II

Preparation of of di-[4,4-di(t-butylperoxy)valeroyl]peroxide $$\begin{array}{c} OOC-(CH_3)_3 \quad O \quad\quad O \quad\quad OOC-(CH_3)_3 \\ | \quad\quad\quad\quad \| \quad\quad \| \quad\quad\quad | \\ CH_3-C-CH_2-CH_2-C-O-O-C-CH_2-CH_2-C-CH_3 \\ | \quad\quad\quad\quad\quad\quad\quad\quad\quad\quad\quad\quad\quad | \\ OOC-(CH_3)_3 \quad\quad\quad\quad\quad\quad\quad\quad OOC-(CH_3)_3 \end{array}$$

Structure A where $P_1 = (CH_3)_3-COO-\underset{\underset{OOC(CH_3)_3}{|}}{\overset{\overset{CH_3}{|}}{C}}$ $R = -CH_2-CH_2-;\ R^1 = \text{nothing};\ D = \text{nothing}$ $P_2 = -\overset{O}{\overset{\|}{C}}-OO-\overset{O}{\overset{\|}{C}}-CH_2-CH_2-\underset{\underset{OOC-(CH_3)_3}{|}}{\overset{\overset{OOC-(CH_3)_3}{|}}{C}}-CH_3$ $y = 1;\ n = 1;\ m = 1$ To a solution of 7.8 g. (0.1 mole) of sodium peroxide in 40 ml. of H₂O cooled at 10±1° C. was added a solution of 11.8 g. (0.2 mole) of 4,4-di-(t-butylperoxy)valeric anhydride (91%) in 300 ml. of benzene. The addition was made in five minutes. As the addition progressed the reaction temperature gradually rose to 30±1° C. The reaction mixture was allowed to stir for one hour at this temperature. At the end of this time the reaction mixture was diluted with 250 ml. of water and the organic phase separated and washed with water to neutrality. The organic phase was dried over anhydrous magnesium sulfate, filtered and the solvent evaporated under reduced pressure. A weight yield of 7.9 g. of thick oil was obtained. This oily product on standing solidified. M.P. 32–35° C. Active oxygen content was 12.74%. Theoretical active oxygen for the desired product 14.4%. The I.R. indicated that the desired product was prepared. The diacyl peroxide $$\left[ -CH_2-\overset{O}{\overset{\|}{C}}-OO-\overset{O}{\overset{\|}{C}}-CH_2- \right]$$

portion of the molecule has a 10 hour half-life at approximately 69° C. and the diperketal portion $$(CH_3)_3COO-\underset{|}{\overset{\overset{CH_3}{|}}{C}}-OOC-(CH_3)_3$$

has a 10 hour half-life at approximately 110° C.

EXAMPLE III

Preparation of 2,24-tris(t-butylperoxy)-4-methylpentane $$\begin{array}{c} CH_3 \quad\quad OOC-(CH_3)_3 \\ | \quad\quad\quad\quad | \\ CH_3-C-CH_2-C-CH_3 \\ | \quad\quad\quad\quad | \\ O \quad\quad\quad\quad O \\ | \quad\quad\quad\quad | \\ C-(CH_3)_3 \quad C-(CH_3)_3 \end{array}$$

Structure A where $P_1 =$ $P_1 = (CH_3)_3-COO-\underset{\underset{CH_3}{|}}{\overset{\overset{CH_3}{|}}{C}}-,\ R = -CH_2-$ $D = \text{nothing},\ R^1 = \text{nothing}$ $P_2 = (CH_3)_3C-OO-\underset{\underset{\underset{C-(CH_3)_3}{|}}{\underset{O}{|}}}{\overset{\overset{CH_3}{|}}{C}}-;\ n = 1,\ m = 1$ To a mixture of 10.1 g. (0.05 mole) of 2-methyl-2-(t-butylperoxy)-4-pentanone and 11.45 g. (0.1 mole) of t-butyl hydroperoxide (78.5%) containing 18% di-t-butyl peroxide cooled at 0±1° C. was added 37.4 g. of H₂SO₄ (69%) over a period of one hour. Care was taken during the addition of the sulfuric acid that the reaction temperature was controlled at 5±1° C. After the addition was completed the mixture was allowed to react for five hours at 5±1° C. At the end of this period the mixture was poured over crushed ice and the organic phase separated, washed with H₂O to neutrality, dried over anhydrous magnesium sulfate, filtered and the volatiles stripped under reduced pressure. A weight yield of 8 g. was obtained. The I.R. indicated that the desired product was prepared. The diperketal portion $$\left[ (CH_3)_3COO-\underset{|}{\overset{\overset{CH_3}{|}}{C}}-OOC(CH_3)_3 \right]$$

of the molecule has a 10 hour half-life at approximately 110° C. and the dialkyl portion $$\left[ \begin{array}{c} CH_3 \\ | \\ CH_3-C-CH_2- \\ | \\ O \\ | \\ O \\ | \\ C-(CH_3)_3 \end{array} \right]$$

has a 10 hour half-like at approximately 128° C.

EXAMPLE IV

Preparation of di-[2-(t-butylperoxycarbonyl)ethyl] peroxydicarbonate $$(CH_3)_3-C-OO-\overset{O}{\underset{\|}{C}}-CH_2-CH_2-O-\overset{O}{\underset{\|}{C}}-OO-\overset{O}{\underset{\|}{C}}-O-CH_2-CH_2-\overset{O}{\underset{\|}{C}}-$$

$$OO-C-(CH_3)_3$$

Structure A where:

$P_1=(CH_3)_3-C-OO\overset{O}{\underset{\|}{C}}-$; $R=-CH_2-CH_2-$;
$D=$nothing; $R^1=$nothing:

$P_2=-O-\overset{O}{\underset{\|}{C}}-OO-\overset{O}{\underset{\|}{C}}-O-CH_2-CH_2-\overset{O}{\underset{\|}{C}}-OO-C-(CH_3)_3$;

$n=1$; $m=1$; $y=1$.

To a solution of 15.8 g. (0.0361 mole+10% excess) of sodium hydroxide (10%) cooled at 5±1° C. was added 7 g. (0.0181 mole+10% excess) of hydrogen peroxide (10%). After the addition was completed one drop of wetting agent was added (aquet) and 10.8 g. (0.0361 mole) of 2-(t-butylperoxycarbonyl)ethyl chloroformate (75%) was added dropwise over a period of five minutes. After the addition was completed the mixture was allowed to stir for two hours at 20±1° C. At the end of this period the reaction mixture was extracted with diethyl ether. The ether extract was washed with water to neutrality, dried over anhydrous magnesium sulfate, filtered and the solvent evaporated under reduced pressure. A weight yield of 7.4 g. was obtained. Purity determined by active oxygen content was 93.5%. The I.R. indicated that the desired product was prepared. The peroxydicarbonate $$\left[-CH_2O-\overset{O}{\underset{\|}{C}}-OO-\overset{O}{\underset{\|}{C}}-OCH_2-\right]$$

portion of the molecule has a 10 hour half-life at approximately 45° C. and the peroxyester $$\left[(CH_3)_3-COO-\overset{O}{\underset{\|}{C}}-\right]$$

portion has a 10 hour half-life at approximately 102° C.

EXAMPLE V

Preparation of di-[2-(t-butylperoxycarbonyl)benzoyl] peroxide

Structure A where:

$P_1=(CH_3)_3C-OO-\overset{O}{\underset{\|}{C}}-$; $R=$ (phenyl)

$D=$nothing; $R_1=$nothing $P_2=-\overset{O}{\underset{\|}{C}}-OO-\overset{O}{\underset{\|}{C}}-$ (phenyl with $(CH_3)_3C-OO\overset{O}{\underset{\|}{C}}$ substituent)

$n=1$, $m=1$, $y=1$

To 10 ml. of water, cooled at 5±1° C. was added 0.8 g. (0.01 mole) of sodium peroxide and one drop of 27% solution of tergitol. This mixture was allowed to stir for 10 minutes and then 5.3 g. (0.02 mole) of t-butyl O-(chloroformyl)peroxybenzoate (95.5%) was added over a period of five minutes while the reaction temperature was controlled at 5±1° C. After the addition was completed the reaction mixture was allowed to stir for 30 minutes at 5±1° C. At the end of this time the reaction mixture was diluted with water and the organic phase extracted with diethyl ether. The ether extract was washed with water to neutrality dried over anhydrous magnesium sulfate, filtered and the solvent evaporated under reduced pressure. A weight yield of 4 g. of viscous liquid was obtained. The I.R. of this material indicated that the desired product was prepared. The diacyl peroxide portion $$\left[-\overset{O}{\underset{\|}{C}}-OO-\overset{O}{\underset{\|}{C}}-\right]$$

of the molecule has a 10 hour half-life at approximately 69° C. and the peroxyester portion $$\left[(CH_3)_3C-OO-\overset{O}{\underset{\|}{C}}-\right]$$

has a 10 hour half-life at approximately 102° C.

EXAMPLE VI

Preparation of di-[1,3-dimethyl-1-hydroperoxy-3-(t-butylperoxy)butyl]peroxide $$CH_3C-CH_2-\underset{\underset{C-(CH_3)_3}{\overset{O}{\underset{|}{O}}}}{\overset{OOH}{\underset{|}{C}}}-O-O-\underset{\underset{C-(CH_3)_3}{\overset{O}{\underset{|}{O}}}}{\overset{HOO}{\underset{|}{C}}}-CH_2-\underset{CH_3}{\overset{CH_3}{\underset{|}{C}}}-CH_3$$

Structure A where:

$P_1=(CH_3)_3C-OO-\underset{CH_3}{\overset{CH_3}{\underset{|}{C}}}-$; $R=-CH_2-$ $D=$nothing; $R^1=$nothing;

$P_2=-\underset{\underset{H}{\overset{O}{\underset{|}{O}}}}{\overset{CH_3}{\underset{|}{C}}}-O-O-\underset{\underset{H}{\overset{O}{\underset{|}{O}}}}{\overset{CH_3}{\underset{|}{C}}}-CH_2-\underset{CH_3}{\overset{CH_3}{\underset{|}{C}}}-OOC(CH_3)_3$; $n=1$; $m=1$ To 10.2 g. (0.15 mole) of hydrogen peroxide (50%) cooled at 5±1° C. was added 9.5 g. of sulfuric acid (77%). After the addition was completed, the reaction temperature was lowered to 0±1° C. and 10.1 g. (0.05 mole) of 2 - methyl-2(t-butylperoxy)-4-pentanone was added dropwise at such a rate that the reaction temperature could be controlled at 0±1° C. After the addition was completed the mixture was allowed to stir for four hours at 5±1° C. At the end of this time the reaction mixture was poured over crushed ice and the organic phase separated by extraction with diethyl ether. The ether solution was washed to neutrality with water, dried over anhydrous magnesium sulfate, filtered and the solvent evaporated under reduced pressure. A weight yield of 9 g. of a viscous liquid was obtained. The I.R. of this material indicated that the desired product was prepared. The hydroperoxy portion $$\left[-\underset{\underset{O-O}{|}}{\overset{OOH}{\underset{|}{C}}}\underset{\underset{}{}}{\overset{OOH}{\underset{|}{C}}}-\right]$$

of the molecule is activated with metal catalyst down to R.T. and the dialkyl peroxide portion remains intact with a 10 hour half-life of 128° C.

$$CH_3-\underset{\underset{OOC-(CH_3)_3}{}}{\overset{CH_3}{\underset{|}{C}}}-CH_2-$$

EXAMPLE VII

Preparation of O,O-t-butyl O-[1,3-dimethyl-3-(t-butylperoxy)butyl] monoperoxycarbonate $$CH_3-\underset{\underset{C-(CH_3)_3}{\overset{O}{\underset{|}{O}}}}{\overset{CH_3}{\underset{|}{C}}}-CH_2-\underset{H}{\overset{CH_3}{\underset{|}{C}}}-O-\overset{O}{\underset{\|}{C}}-OO-C-(CH_3)_3$$

11

Structure A where:

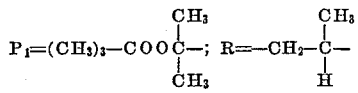

D=nothing; R¹=nothing

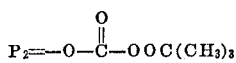

n=1 and m=1

To a solution of 9.7 g. (0.03 mole) of 1,3-dimethyl-3-(t-butylperoxy)butyl chloroformate (78%) in diethyl ether cooled at 5±1° C. was added dropwise a mixture of 2.7 g. (0.03 mole) of t-butyl hydroperoxide (98.6%), 2.4 g. (0.03 mole) of pyridine in 50 ml. of diethyl ether. After the addition was completed the reaction mixture was allowed to react for two hours while the reaction temperature was allowed to rise to 20±1° C. After this time the pyridine hydrochloride was filtered off and the ether solution washed with 10% solution of tartaric acid and water to neutrality. The ether phase was dried over anhydrous magnesium sulfate, filtered and the solvent evaporated under reduced pressure. A weight yield of 7.0 g. of an oily liquid was obtained. The I.R. indicated that the desired product was prepared. The monoperoxycarbonate portion

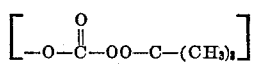

of the molecule has a 10 hour half-life at approximately 99° C. and the dialkyl peroxide portion

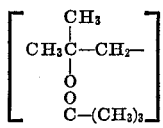

has a 10 hour half-life at approximately 128° C.

EXAMPLE VIII

Preparation di-[3,3-bis(t-butylperoxy)butyl]peroxydicarbonate

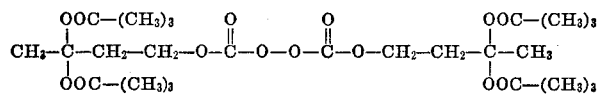

Structure A where:

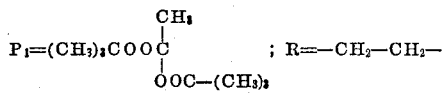

D=nothing; R¹=nothing

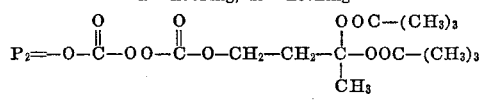

n=1; and m=1

To a solution of 8.1 g. (0.02 mole+10%) of $H_2O_2$ (9%) cooled at 5±1° C. was added 8.8 g. (0.04 mole+10%) of NaOH (20%). After the addition was completed three drops of a 27% solution of Tergitol was added. To this mixture was added 12.6 g. (0.04 mole) of 3,3-bis(t-butylperoxy)butyl chloroformate (99.6%). The mixture was allowed to stir for three hours at 30±1° C. After this time the reaction mixture was extracted with pentane. The ether extract was washed with water to neutrality, dried over anhydrous magnesium sulfate, filtered and the solvent evaporated under reduced pressure. A solid was obtained 4.8 g. M.P. 48–50° C. The I.R. of this material showed the characteristic bands for the desired product. The peroxydicarbonate portion

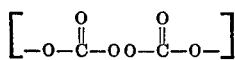

12 of the molecule has a 10 hour half-life at approximately 45° C. and the diperketal portion has a 10 hour half-life

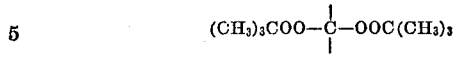

at approximately 110° C.

(II) Utility

The sequential free radical initiators of this invention may be used in any operation or reaction where a peroxy compound could be used, taking in account the sequential free radical generation characteristic. Thus they can be used to polymerize vinyl monomers and cure unsaturated polyester resins, by decomposing partially or simultaneously all the peroxy functions present. They also can be used to prepare polymers containing peroxy groups as part of the polymer. These polymers are very useful for the preparation of block and graft copolymers, which is the preferred use of the compounds of this invention.

(III) Methods of utilization

The sequential free radical initiators represented in structure A & B are useful to prepare polymers from vinyl monomers (e.g. styrene, vinyl chloride, vinyl acetate, ethyl acrylate, methyl methacrylate, butadiene-acrylonitrile, acrylamide, acrylic acid, vinylcarbazole, vinyltoluene, vinylpyridine, vinylidine chloride and the like) by decomposing them at a temperature where all the peroxides functions can be decomposed.[1] Similarly unsaturated polyester resins can be cured by conventional methods. On the other hand if polymerization of vinyl monomers is carried out in such a way that only partial decomposition if the peroxy functions is obtained while the others remain substantially undecomposed then peroxide containing polymers are prepared (Examples IX, XI). These peroxide containing polymers can be stored for later use or can be utilized for preparation of block or graft copolymers (Examples X, XII). The temperatures at which the polymerization are carried out will depend upon the polymerization technique, the monomer and the physical properties desired in the polymer but most important of all upon the half-life of the sequential free radical initiator used. The half-lives of the sequential free radical initiators can be determined by conventional methods. However, it may not be necessary to accurately determine the half-life of each portion of the sequential free radical initiators since most half-lives can be predicted within a few degree from the closest monoperoxy analog, many of which are well known. Ten-hour half-life ranges of some typical peroxides are given in Table II.

---

[1] Dickey U.S. Pat. No. 2,698,863 at col. 5 gives an excellent presentation of now conventional vinyl polymerization technique and suitable monomers for peroxy group initiators—this is adopted as suitable for the compounds and adaptable for the sequential free radical initiated process of the invention.

TABLE II
[Ten-hour half-life temperature ranges of various peroxides]

| Peroxide class | General structure | 10 hours half-life range (° C.) |
|---|---|---|
| Alkyl peroxides | R''—C(R''')(R')—OO—C(R''')(R')—R'' | ~117–128 |
| Diperoxyketals | R''(OR)(OR)C(R'') | ~101–110 |

TABLE II—Continued

| Peroxide class | General structure | 10 hours half-life range (° C.) |
|---|---|---|
| t-Alkyl peroxyesters | $R'CH_2-\overset{O}{\underset{\|}{C}}-OOR$ | ~102 |
| | $R''-\underset{\underset{R}{\|}}{CH}-\overset{O}{\underset{\|}{C}}-OOR$ | ~66–79 |
| | $R''-\underset{\underset{R'}{\|}}{\overset{\overset{R'}{\|}}{C}}-\overset{O}{\underset{\|}{C}}-OOR$ | ~54–55 |
| | $\underset{/}{\overset{\backslash}{C}}=\underset{\|}{C}-\overset{O}{\underset{\|}{C}}-OOR$ | ~98–105 |
| O-alkyl O, O-t-alkyl monoperoxycarbonates. | $R'O-\overset{O}{\underset{\|}{C}}-OOR$ | ~99 |
| Diacyl peroxides | $\left[R'CH_2-\overset{O}{\underset{\|}{C}}-O\right]_2$ | ~61–69 |
| | $\left[R''-\underset{\underset{R'}{\|}}{C}-\overset{O}{\underset{\|}{C}}-O\right]_2$ | ~23–34 |
| | 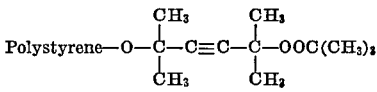 | ~54–75 |
| Peroxydicarbonates | $R'O-\overset{O}{\underset{\|}{C}}-OO-\overset{O}{\underset{\|}{C}}-OR'$ | ~45 |
| Di-t-alkyl diperoxy-carbonates. | $ROO-\overset{O}{\underset{\|}{C}}-OOR$ | ~90–95 | where R=t-alkyl radical;
R′, R″, R‴=aliphatic or aromatic radical.

The following examples will illustrate the utility of the products of this invention without limiting its scope.

PREPARATION OF PEROXY CONTAINING POLYMERS

Description of the method

For sequential free radical initiators containing hydroperoxy groups, redox activation was used to carry out the first polymerization by emulsion method. These polymerizations were carried out in a 1000 ml. resin kettle which was mounted in a constant temperature bath for adequate temperature control. The reaction kettle was equipped with mechanical stirrer, dropping burette, thermometer, condenser and nitrogen inlet tube. The reaction charge was basically the same in all of the emulsion polymerizations mainly:

100 g. of deionized water
50 g. of distilled styrene
0.5 g. of catalyst
0.01% to 0.3% of either a suspension agent or emulsifier An aqueous solution of a reducing agent was added in small increments (sodium formaldehyde sulfoxylate).

For sequential free radical initiators containing peroxide functions of different half-life value the first polymerization was either a thermal emulsion or suspension polymerization carried out at a lower temperature sufficient to preferably activate the more active peroxide group. The second polymerization to form the block or graft copolymer consisted: in purifing the first polymer by precipitation to remove residual peroxide, dissolving it in distilled methyl methacrylate and sealing this mixture in a 13 x 150 mm. test tube.

Usually 1 g. of the first polymer was dissolved in 10 ml. of methyl methacrylate. In each case the reaction tube was placed in a 100° C. constant temperature bath for a period not less than one hour. The reaction tube was immediately quenched after removal from the bath and the polymer mixture was separated into various fractions by solvent non-solvent precipitation techniques specific for each polymer species. The isolated fractions in each case were identified through their infrared spectrum and comparison with known spectra of the possible polymers present in the mixture. Confirmation of block or graft copolymer formation was obtained when a fraction had spectral characteristics of both homopolymer species. Further evidence for the formation of a polystyrene-poly (methyl methacrylate) block or graft copolymer was obtained from the demixing test similar to those of Hughes and Brown [2] and Molaw.[3]

EXAMPLE IX

Preparation of peroxide-containing polystyrene using 2,5-dimethyl-2-t-butylperoxy-5-hydroperoxyhexyne-3

$$Polystyrene-O-\underset{\underset{CH_3}{\|}}{\overset{\overset{CH_3}{\|}}{C}}-C\equiv C-\underset{\underset{CH_3}{\|}}{\overset{\overset{CH_3}{\|}}{C}}-OOC(CH_3)_3$$

To a mixture of 100 g. of deionized water and 0.5 g. of ivory soap and 50 g. of distilled styrene was added 2.5×10⁻³ moles of 2,5-dimethyl-2-t-butylperoxy-5-hydroperoxyhexyne-3. This mixture was set in a constant temperature bath (50±1° C.) and nitrogen gas was bubbled through while 32.95 ml. of a solution of sodium formaldehyde sulfoxylate (0.1 g./ml.) was added dropwise. After the addition was completed the reaction mixture was allowed to react for 2.9 hours. The polymer formed was filtered and washed with water and air dried. The polymer was purified by dissolving it in benzene and precipitated with absolute methanol (4 times). A weight yield of 20.2 g. was obtained or 40.5% conversion. The infrared spectrum showed the characteristic absorption bands for polystyrene and iodometric titration showed presence of peroxy groups.

EXAMPLE X

Preparation of polystyrene - poly(methyl methacrylate) block copolymer from the peroxy containing polystyrene prepared in Example IX A solution of 10 ml. of methyl methacrylate and 1 g. of peroxide containing polystyrene was placed in a test tube (15 x 150 mm.) which was flushed with nitrogen gas and sealed and placed in a constant temperature bath at 100° C. for one hour and thirty minutes. After this time the reaction tube was cooled and the polymer mixture was purified by dissolving the polymer in benzene and the block copolymer precipitated with petroleum ether. After drying, it weighed 5.0 grams. The infrared spectrum showed the characteristic absorption bands of polystyrene and poly(methyl methacrylate).

In a blank run, methyl methacrylate gave no polymer after one hour and thirty minutes at 100° C.

EXAMPLE XI

Preparation of peroxide containing polystyrene using the sequential free radical initiator prepared in Example I To 5 g. of distilled styrene was added 1 g. of di-[1,3-dimethyl - 3 - (t-butylperoxy)butyl]peroxydicarbonate. The reaction mixture was kept under nitrogen in a sealed tube at 50° C. for 16 hours. The polymer obtained is dissolved in benzene and precipitated with absolute methanol (4 times). After drying under vacuum the conversion of monomer to polymer was 92%. The polymer was analyzed by iodometric titration and it was found to contain 0.79% active oxygen. A blank run under the same condition but without an initiator gave only a 0.5% conversion of monomer to polymer.

---

[2] Hughes and Brown, J. Appl. Poly. Sci. 7, 59 (1963).
[3] Molan, J. Polymer Sci. A3–1267 (1965).

EXAMPLE XII

Preparation of a polystyrene-poly(methyl methacrylate) block copolymer from the peroxy containing polystyrene of Example XI A mixture of 9 g. of methyl methacrylate and 1 g. of the peroxy containing polystyrene from Example XI was heated at 100° C. under nitrogen in a sealed tube for 16 hours. The resultant reaction mixture was dissolved in benzene and the block copolymer precipitated with petroleum ether (4 times). After drying, it weighed 4.6 g. In a blank run, methyl methacrylate gave no polymer after 16 hours at 100° C.

The infrared spectrum showed the characteristic absorption bands of polystyrene and poly(methyl methacrylate). Further evidence for the formation of polystyrene-poly(methyl methacrylate) block copolymer was obtained from the demixing tests as shown below.

|  | Control | Test XII |
|---|---|---|
| Polystyrene homopolymer | 0.39 g. | 0.39 g. |
| Poly(methyl methacrylate) homopolymer | 0.39 g. | 0.39 g. |
| Polystyrene-poly(methyl methacrylate) block copolymer | | 0.39 g. |
| Chloroform | 5.22 g. | 5.22 g. |
| Demixing time | 50 min. | 16 hrs. |

EXAMPLES XIII–XVII AND TEST XVIII

Preparation of polystyrene-poly(methyl methacrylate) block copolymers illustrated by using di-t-butyl α-(substituted)diperoxysuccinates

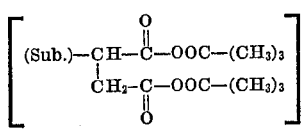

Legend

Example XIII (Compound 16):
  di-t-butyl α-(methoxycarbonyl)diperoxysuccinate.
Example XIV (Compound 17):
  di-t-butyl α-(2-tetrahydrofuryl)diperoxysuccinate.
Example XV (Compound 18):
  di-t-butyl α-(butyryl)diperoxysuccinate.
Example XVI (Compound 19):
  di-t-butyl α-(pivaloyl)diperoxysuccinate.
Example XVII (Compound 20):
  di-t-butyl α - (2-isopropoxyisopropyl)diperoxysuccinate, otherwise named t-butyl 3-(t-butylperoxycarbonyl)-4-methyl-4-isopropoxyperoxyvalerate.
Test XVIII (For control purposes):
  Propionyl peroxide.

(A) General procedure for the preparation of polystyrene containing peroxide (see Table A for details)

Into a 16 x 150 mm. Pyrex test tube was added a specified amount of the above peroxides and distilled styrene monomer. The tube was purged with N₂ and sealed. After the specified reaction time the polymer was dissolved in benzene and precipitated from methanol. After three reprecipitations the polymer was dried under vacuum at ambient temperature and analyzed for active oxygen content by iodometric titration procedures.

TABLE A
[Preparation of polystyrene containing peroxide]

| | Peroxides | Styrene (grams) | Reaction | | Polystyrene peroxide product | | |
|---|---|---|---|---|---|---|---|
| Ex. No. | Grams | | Time (hrs.) | Temp. (° C.) | Grams | Percent A(O) | |
| XIII | 1.00 | 10.00 | 13.30 | 60 | ~10.00 | 0.15 | XIII A |
| XIV | 1.00 | 10.00 | 13.25 | 70 | 5.95 | 0.07 | XIV A |
| XV | 1.13 | 10.17 | 4.00 | 85 | 9.82 | 0.09 | XV A |
| XVI | 1.05 | 10.01 | 7.25 | 70 | 7.31 | 0.21 | XVI A |
| XVII | 0.98 | 9.84 | 6.25 | 70 | 7.94 | 0.27 | XVII A |
| Test XVIII | 0.68 | 20.00 | ¹8 | 60 | 7.00 | 0.014 | XVIII A |

¹ Used 15 grams of the mixture in the test.

(B) General procedure for the preparation of a polystyrene-poly(methyl methacrylate) block copolymer (see Table B for details)

Into a 16 x 150 mm. Pyrex test tube was added one part of the peroxy-terminated polystyrene prepared in Table A and two parts methyl methacrylate monomer (distilled). The tube was purged with N₂ and sealed. After the specified reaction time the solid polymer was dissolved in benzene, precipitated from ethanol and dried under vacuum at ambient temperature.

TABLE B
[Preparation of block copolymers]

| Polystyrene peroxide product | | MMA monomer (g.) | Reaction | | Block copolymer product | |
|---|---|---|---|---|---|---|
| | Grams | | Time (hrs.) | Temp. (° C.) | Grams | |
| XIII A | 1.00 | 2.00 | 1.0 | 85 | ~2.7 | XIII B |
| XIV A | 2.57 | 5.15 | 3.2 | 85 | 6.71 | XIV B |
| XV A | 4.19 | 8.38 | 1.1 | 100 | 10.07 | XV B |
| XVI A | 3.59 | 7.18 | 3.2 | 85 | 9.42 | XVI B |
| XVII A | 3.49 | 6.99 | 2.0 | 85 | 9.40 | XVII B |
| XVIII A | 2.00 | 4.00 | 2.0 | 85 | 3.60 | XVIII B |

The infrared spectrum showed the characteristic absorption bands of polystyrene and poly(methyl methacrylate). Further evidence for the formation of polystyrene-poly(methyl methacrylate) block copolymer was obtained from the demixing tests as shown below in Table C.

(C) Demixing tests

To a 16 x 150 mm. Pyrex test tube was added the following chloroform solutions:

(1) 3.0 g. of 13% polystyrene (Dow PS-3).
(2) 3.0 g. of 13% poly(methyl methacrylate) (Rohm and Haas, Acryloid A-11).
(3) 3.0 g. of 13% block polymer. The tube was sealed and the contents mixed thoroughly by shaking. Mixture was observed periodically for indications of demixing.
(4) The control solution consisted of equal parts of 1 and 2.

TABLE C.—DEMIX TIME

| Block copolymer product: | Demix time |
|---|---|
| XIIIB | >65 days.. |
| XIVB | (¹). |
| XVB | >56 hours. |
| XVIB | (¹). |
| XVIIB | 48 hours. |
| XVIIIB | 3 hours. |
| Control | 45 minutes. |

¹ The viscosity of 13% solutions was too high to run this test.

Thus having described the invention what is claimed is:

1. In a process for preparing block copolymers by sequentially polymerizing monomers in the presence of free radical initiators, the improvement which comprises using as the free radical initiator a polyperoxy compound having at least two functional peroxy groups, at least one of the functional groups having a half-life different from the other functional groups, said polyperoxy compound having the general structure:

(A) $(P_1)_n$—R—D—$R^1$—$(P_2)_m$ where:

$P_1$ is

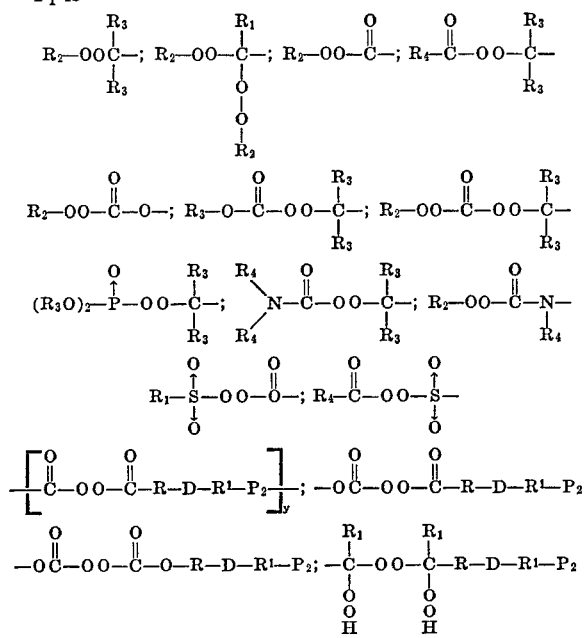

or

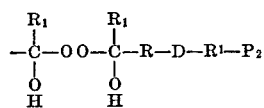

$P_2$ is

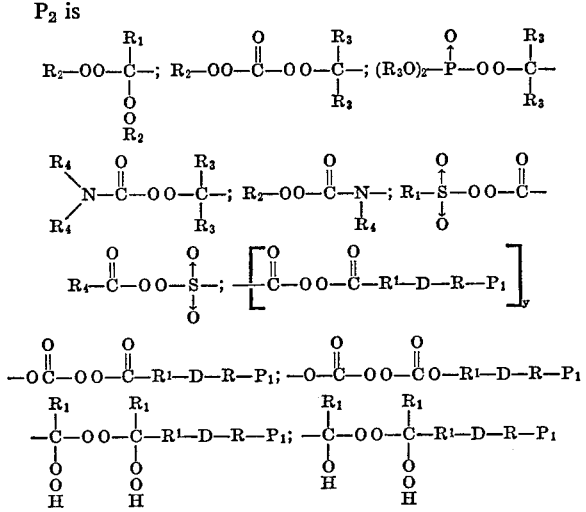

or

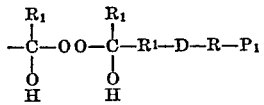

D is nothing:

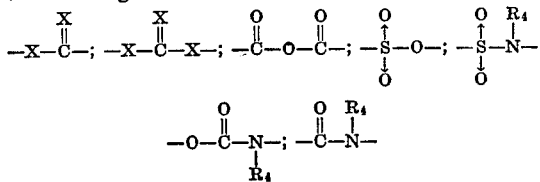

or —X—;

X is oxygen or sulfur;

R and $R^1$=aliphatic, cycloaliphatic or aromatic polyvalent radicals of 1 to 15 carbons, R and $R^1$ can be the same or different, and R or $R^1$ can also be nothing;
$R_1$=aliphatic of 1 to 10 carbons or cycloaliphatic of 3 to 12 carbons;
$R_2$=t-aliphatic or t-cycloaliphatic having 4 to 13 carbons;
$R_3$=aliphatic of 1 to 10 carbons, cycloaliphatic of 3 to 12 carbons or aromatic of 6 to 12 carbons;
$R_4$=hydrogen, aliphatic of 1 to 10 carbons, cycloaliphatic of 3 to 12 carbons, or aromatic of 6 to 12 carbons;
m and n=1 or 2; and
y=at least 1.

2. The process of claim 1 where said polyperoxy compound is di[1,3-dimethyl-3-(t-butylperoxy)butyl]peroxydicarbonate.

3. The process of claim 1 where said polyperoxy compound is di[4,4-di(t-butylperoxy)valeroyl] peroxide.

4. A process of preparing vinyl polymers having as an integral part thereof functional peroxy groups, which process comprises polymerizing a vinyl monomer in the presence of a polyperoxy free radical affording compound having at least two functional peroxy groups, at least one of the functional groups having a half-life different from the other functional groups, under conditions such that the peroxy group having the shorter half-life is decomposed, thereby initiating the polymerization reaction and producing a vinyl polymer containing a residue including the functional peroxy group having the longer half-life, said polyperoxy compound having the structure (A) defined in claim 1.

5. The process of preparing a block copolymer which process comprises copolymerizing a vinyl monomer and a vinyl polymer containing functional peroxy groups prepared by the process of claim 4 under conditions to decompose said peroxy group and to initiate copolymerization of said vinyl polymer and said monomer to form a block copolymer.

6. The process of preparing a polystyrene containing functional peroxy groups which process comprises polymerizing styrene at a temperature of about 50° C. in the presence of di[1,3 - dimethyl - 3 - (t-butylperoxy)butyl] peroxydicarbonate to decompose the peroxydicarbonate group to initiate the polymerization for a time of about 16 hours and recovering from the reaction mixture a solid polystyrene polymer containing functional peroxy groups.

7. The process for preparing a block copolymer of polystyrene and poly(methyl methacrylate) which process comprises polymerizing methyl methacrylate monomer and the peroxy group containing polystyrene of claim 6 at a temperature of about 100° C. for a time of about 16 hours.

References Cited
FOREIGN PATENTS 857,145 12/1960 Great Britain _____ 260—885
936,008 9/1963 Great Britain _____ 260—885

OTHER REFERENCES

Ol'dekov et al., Acyl Peroxides, Journal of Organic Chemistry of the U.S.S.R., vol. 4, No. 3 (March 1968), pp. 419–422.

Ol'dewov et al., Di-t-Butylperoxysulfamidoacetic Acid and Its Derivatives, J. of Organic Chemistry of the U.S.S.R., vol. 3, No. 8, pp. 1346–48 (August 1967).

MURRAY TILLMAN, Primary Examiner

J. SEIBERT, Assistant Examiner

U.S. Cl. X.R.

260—93.5 R, 874, 876 B, 879, 884, 886, 610 R, 160 D